United States Patent
Mueller et al.

(10) Patent No.: US 8,733,756 B2
(45) Date of Patent: May 27, 2014

(54) APPARATUS FOR FRONT/TOP LAY VERTICAL ADJUSTMENT AND SHEET-FED ROTARY PRINTING PRESS HAVING THE APPARATUS

(75) Inventors: Andreas Mueller, Heidelberg (DE); Henning Niggemann, Dossenheim (DE); Burkhard Wolf, Dossenheim (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 592 days.

(21) Appl. No.: 13/019,388

(22) Filed: Feb. 2, 2011

(65) Prior Publication Data

US 2011/0185931 A1 Aug. 4, 2011

(30) Foreign Application Priority Data

Feb. 2, 2010 (DE) .......................... 10 2010 006 84

(51) Int. Cl.
*B65H 9/04* (2006.01)
(52) U.S. Cl.
USPC ........................................ 271/254; 271/245
(58) Field of Classification Search
USPC ......... 271/3.02, 245–247, 253–255; 101/231, 101/232

See application file for complete search history.

(56) References Cited

U.S. PATENT DOCUMENTS

| | | | | |
|---|---|---|---|---|
| 4,257,586 A | * | 3/1981 | Weisbach | 271/235 |
| 4,330,117 A | * | 5/1982 | Weisbach | 271/235 |
| 5,596,929 A | * | 1/1997 | Fricke et al. | 101/410 |
| 5,761,998 A | * | 6/1998 | Fricke et al. | 101/232 |
| 6,241,241 B1 | * | 6/2001 | Fricke et al. | 271/245 |
| 6,681,697 B2 | * | 1/2004 | Mohringer et al. | 101/232 |
| 7,992,866 B2 | * | 8/2011 | Muller et al. | 271/243 |
| 2003/0116046 A1 | | 6/2003 | Muhringer et al. | |

FOREIGN PATENT DOCUMENTS

| | | |
|---|---|---|
| DE | 2451461 A1 | 5/1976 |
| DE | 4004461 A1 | 9/1990 |
| DE | 4239254 C2 | 9/2000 |
| DE | 10254330 A1 | 7/2003 |
| DE | 202004021518 U1 | 9/2008 |

OTHER PUBLICATIONS

German Search Report dated Sep. 1, 2010.

* cited by examiner

*Primary Examiner* — Jeremy R Severson
(74) *Attorney, Agent, or Firm* — Laurence A. Greenberg; Werner H. Stemer; Ralph E. Locher

(57) ABSTRACT

An apparatus for the vertical adjustment of combined front/top lays in a sheet processing machine includes a front/top lay carrier shaft carrying the front/top lays jointly in such a way that it can be pivoted with respect to a front/top lay drive shaft, or thrust joints disposed in carriers or coupling links for the front/top lays in such a way that they effect a lengthening of the carriers or coupling links in order to adjust the front/top lays. A sheet-fed rotary printing press having the apparatus, is also provided.

4 Claims, 6 Drawing Sheets

APPARATUS FOR FRONT/TOP LAY VERTICAL ADJUSTMENT AND SHEET-FED ROTARY PRINTING PRESS HAVING THE APPARATUS

CROSS-REFERENCE TO RELATED APPLICATION

This application claims the priority, under 35 U.S.C. §119, of German Patent Application DE 10 2010 006 684.2, filed Feb. 2, 2010; the prior application is herewith incorporated by reference in its entirety.

BACKGROUND OF THE INVENTION

Field of the Invention

The invention relates to an apparatus for the vertical adjustment of combined front/top lays or guides. The invention also relates to a sheet-fed rotary printing press having the apparatus.

In sheet processing machines, front/top lays or guides are provided in the alignment region of sheets, are disposed at a distance from one another in a row transversely with respect to the sheet transport direction and, together with a feed table, form a gap into which the leading edge of a sheet can be inserted. Following the alignment of the sheet and as soon as the latter has been gripped by onward transport devices, the front/top lays are moved out of an operating position on the feed table into a pivoted-away position located outside the sheet transport path.

The top lay is adjusted vertically in order to process sheets of different thicknesses.

German Patent DE 42 39 254 C2 already discloses a vertical adjustment device for combined front/top lays, in which all of the front/top lays, together with a drive shaft driving the same, are mounted so as to be vertically adjustable. In that case, the drive shaft is mounted in levers which are mounted in such a way that they can be pivoted.

SUMMARY OF THE INVENTION

It is accordingly an object of the invention to provide an apparatus for combined front/top lay vertical adjustment and a sheet-fed rotary printing press having the apparatus, which overcome the hereinafore-mentioned disadvantages of the heretofore-known devices of this general type and in which a drive shaft is mounted so as to be fixed to a frame.

With the foregoing and other objects in view there is provided, in accordance with the invention, an apparatus for the vertical adjustment of combined front/top lays in a sheet processing machine having a frame. The apparatus comprises a front/top lay drive shaft fixedly mounted to the frame, a lever connected to the front/top lay drive shaft, and a front/top lay carrier shaft disposed parallel to the front/top lay drive shaft, mounted on the lever and configured to be displaced relative to the front/top lay drive shaft. The front/top lays are mounted on the front/top lay carrier shaft to be pivoted jointly.

With the objects of the invention in view, there is also provided an apparatus for the vertical adjustment of combined front/top lays in a sheet processing machine. The apparatus comprises a front/top lay drive shaft, a front/top lay carrier shaft disposed parallel to the front/top lay drive shaft, a front/top lay carrier, a swivel bearing for the front/top lay carrier, and a thrust joint for the front/top lay carrier. The thrust joint is disposed between the swivel bearing and the front/top lay carrier shaft. The front/top lays are mounted on the front/top lay carrier shaft to be pivoted jointly.

With the objects of the invention in view, there is furthermore provided an apparatus for the vertical adjustment of combined front/top lays in a sheet processing machine. The apparatus comprises a front/top lay drive shaft, a front/top lay carrier shaft disposed parallel to the front/top lay drive shaft, a front/top lay carrier, a swivel bearing for the front/top lay carrier, and a thrust joint for the front/top lay carrier. The thrust joint is disposed between the swivel bearing and the front/top lays. The front/top lays are mounted on the front/top lay carrier shaft to be pivoted jointly.

A particular advantage of the invention is that the position of the drive shaft remains unchanged during the vertical adjustment of the front/top lays, in particular when the latter have a cam roller drive, since, in the case of this drive, the position of the roller lever in relation to the control cam remains unchanged during a change in the front/top lay height.

In accordance with another feature of the invention, the front/top lay body is disposed in such a way that it can be adjusted vertically with respect to the drive shaft through the use of a shaft (front/top lay carrier shaft) that is mounted in such a way that it can be displaced eccentrically. As a result of this measure, all of the front/top lays can be adjusted vertically very exactly with respect to the drive shaft.

In accordance with a further feature of the invention, the front/top lay carrier shaft is mounted in a two-armed lever, which in turn is mounted on a lever that can be pivoted by the drive shaft. In this case, a compression spring that is provided presses the front/top lay carrier shaft, preferably through the use of a roller, against a stop that is mounted on the lever in such a way that it can be adjusted eccentrically.

In accordance with an added feature of the invention, provision is made to drive the front/top lays through the use of coupling links that are connected in an articulated manner, at least one coupling link having a thrust joint to lengthen the coupling link. This lengthening can preferably be produced through the use of a spindle/nut mechanism.

In accordance with an additional feature of the invention, provision is advantageously made to employ actuating motors which, during a lateral displacement of the front and top lays, carry out a correction in the position of the front/top lay in and counter to the sheet transport direction, in order to ensure that the front/top lays can be positioned on their envisioned line of alignment.

With the objects of the invention in view, there is concomitantly provided a sheet-fed rotary printing press, comprising an apparatus according to the invention.

Other features which are considered as characteristic for the invention are set forth in the appended claims.

Although the invention is illustrated and described herein as embodied in an apparatus for front/top lay vertical adjustment and a sheet-fed rotary printing press having the apparatus, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
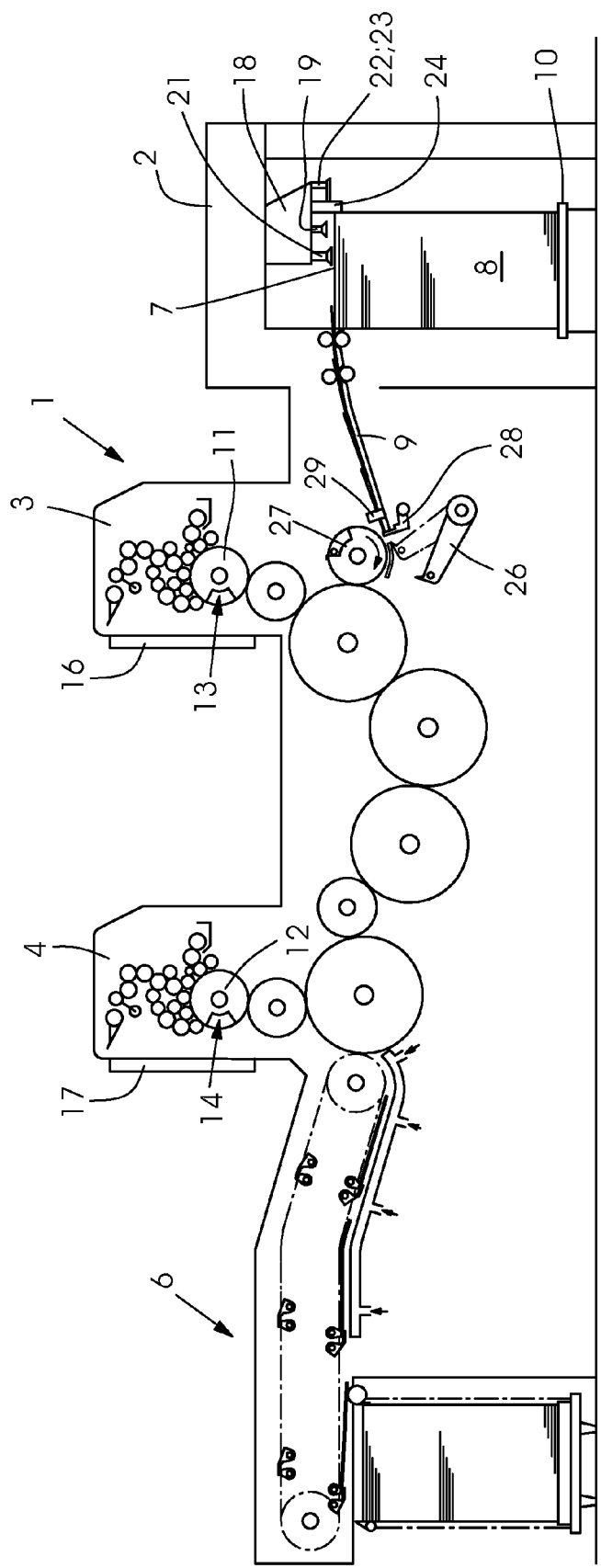
FIG. 1 is a diagrammatic, longitudinal-sectional view of a sheet-fed rotary printing press.

Referring now to the figures of the drawings in detail and first, particularly, to FIG. 1 thereof, there is seen a machine, for example a printing press 1, for processing sheets 7, which has a feeder 2, at least one printing unit 3 and 4 and a delivery 6 mounted in a machine frame. The sheets 7 are taken from a sheet stack 8 and are fed, separated or overlapping, over a feed table 9 to the printing units 3 and 4. The latter each contain a plate cylinder 11, 12, in a known manner. The plate cylinders 11 and 12 each have an apparatus 13, 14 for fixing flexible printing plates. Furthermore, each plate cylinder 11, 12 is assigned an apparatus 16, 17 for semiautomatic or fully automatic printing plate changing.

The sheet stack 8 lies on a stack board 10 that can be raised under control. The sheets 7 are taken from the top side of the sheet stack 8 through the use of a so-called a suction head 18 which, inter alia, has a number of lifting and dragging suckers 19, 21 for separating the sheets 7. Furthermore, blowing devices 22 for loosening the upper sheet layers as well as sensing elements 23 for stack tracking, are provided. A number of lateral and rear stops 24 are provided in order to align the sheet stack 8, in particular the upper sheets 7 of the sheet stack 8.

Leading edge stops 28 combined with top lays or guides, as well as lateral stops 29, are provided in order to align the sheets on the feed table 9, before a transfer of an aligned sheet through the use of a pre-gripper 26 to a feed cylinder 27. The front/top lays 28 serve to align the sheets in the longitudinal direction, i.e. in the direction of the sheet transport. In this case, the top lays, which form a gap together with the feed table 9, prevent the leading sheet edge from leaving an alignment plane during sheet alignment. The front/top lays or guides 28 include a number (e.g. 16) of individual sheet stops disposed transversely with respect to the sheet transport direction, which are disposed in such a way that they can be pivoted jointly from an alignment position on the feed table 9 into a position outside a sheet transport path, cyclically at a cycle rate of the sheet processing machine.

Figure 2:
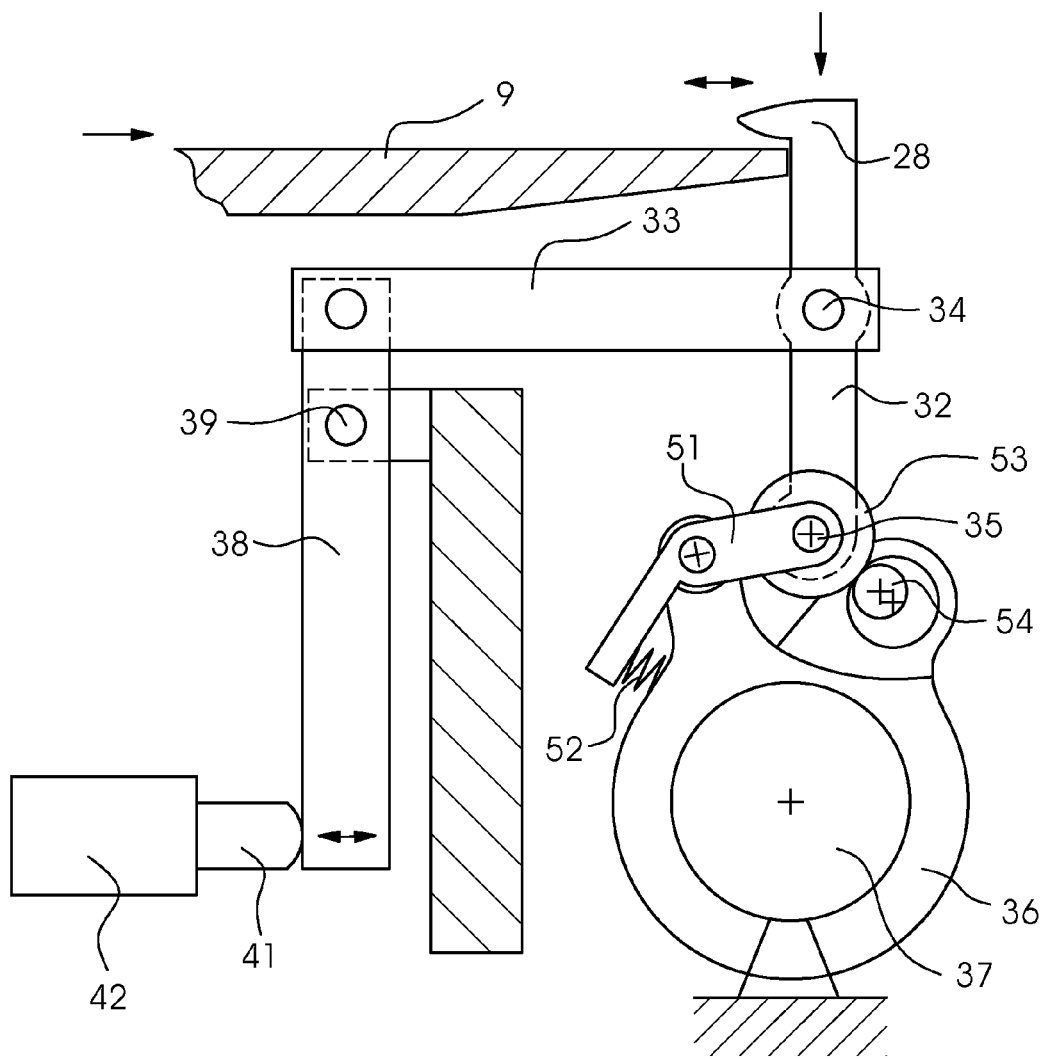
FIG. 2 is an enlarged, fragmentary, partially-sectional view of a front/top lay with a front/top lay carrier shaft mounted in such a way that it can be adjusted with respect to a drive shaft.
Figure 3:
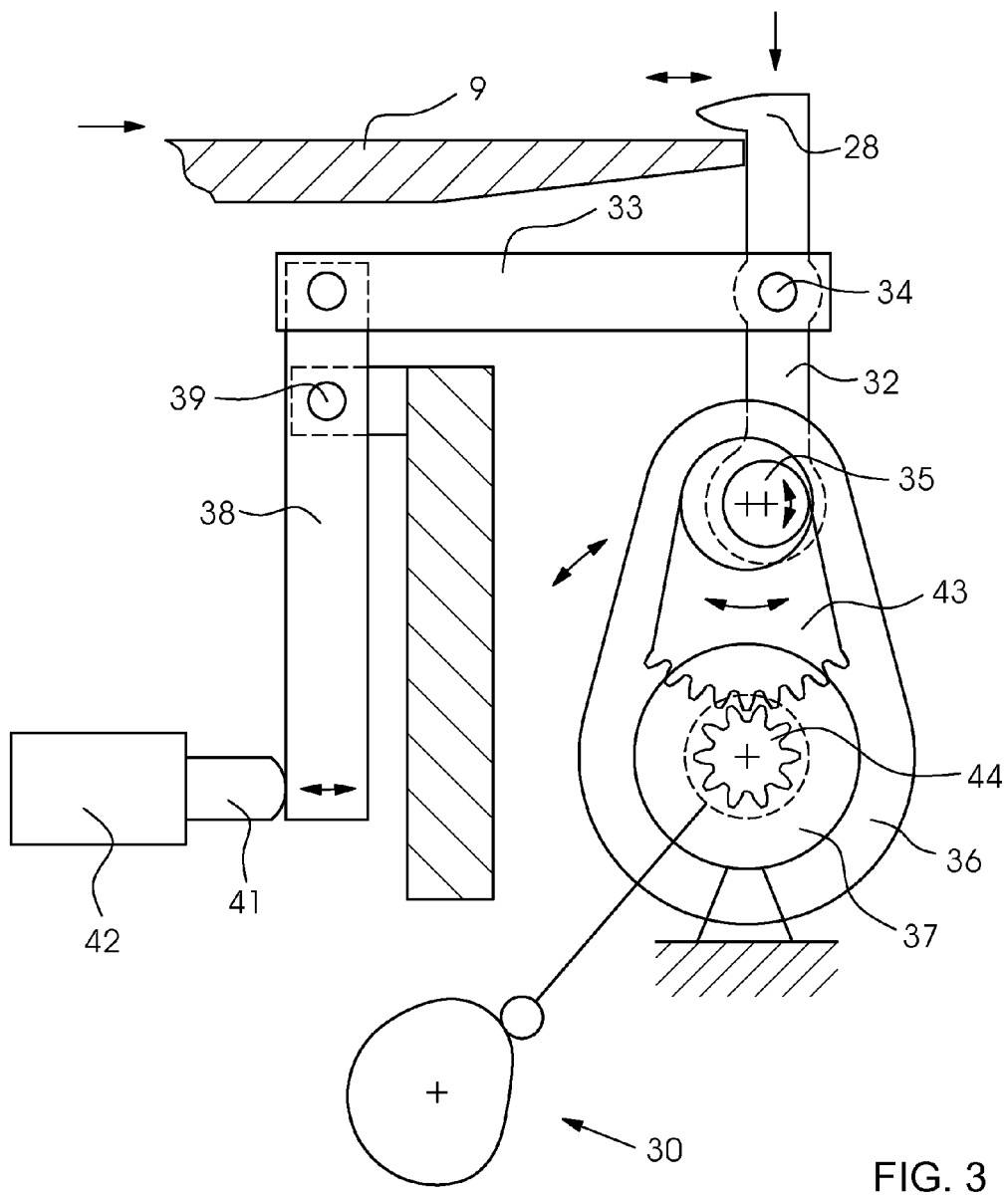
FIG. 3 is a view similar to FIG. 2 of a front/top lay with an eccentric shaft mounted in such a way that it can be adjusted eccentrically with respect to a drive shaft.

FIGS. 2 and 3 each illustrate a combined front/top lay 28, which is located at the end of a front lay carrier 32. The front/top lay carrier 32 is mounted approximately centrally in a swivel bearing 34 at a first end of a coupling link 33. The front/top lay carrier 32, and thus the front/top lays 28 disposed thereon, are pivoted cyclically under a sheet transport path by a pivoting movement about the swivel bearing or bearing point 34.

In an exemplary embodiment according to FIG. 2, the front/top lay carriers 32 are mounted on a joint front/top lay carrier shaft 35 at an end opposite to the front/top lay 28. The shaft 35 is pivotably mounted at a first end of a two-armed lever 51. The lever 51 itself is pivotably disposed on a lever 36 and, at a second end, has a compression spring 52. The spring force of the compression spring 52 presses at least one roller 53 disposed on the front/top lay carrier shaft 35 against a stop 54 that can be adjusted eccentrically. The stop 54 is used for the vertical adjustment of the front/top lay 28 and is likewise disposed on the lever 36.

In the exemplary embodiment according to FIG. 3, the front/top lay carriers 32 are pivotably mounted at an end opposite to the front/top lay 28 on a common eccentric shaft 35 that can be adjusted eccentrically and is disposed in a lever 36. The lever 36 is seated so as to be fixed against rotation on a drive shaft 37, which can be driven so as to be pivoted cyclically at the cycle rate of the sheet processing machine through the use of a cam/roller mechanism 30 that is disposed in a stationary manner.

At an end opposite to the swivel bearing 34 for the front/top lay carrier 32, the coupling link 33 is connected in an articulated manner to a second lever 38, which is disposed in such a way that it can be pivoted about a bearing 39 fixed to the frame. An actuating element 41 of an actuating motor 42 acts at a free end of the lever 38 in order to pivot the lever 38 about the bearing 39 fixed to the frame and therefore to displace the swivel bearing 34 in and counter to the sheet transport direction. As a result of this measure, a displacement of the top/front lay 28 in and counter to the sheet transport direction can be carried out in order, for example, to achieve a correction or adjustment of the line of alignment defined by the front/top lays 28.

Figure 4:
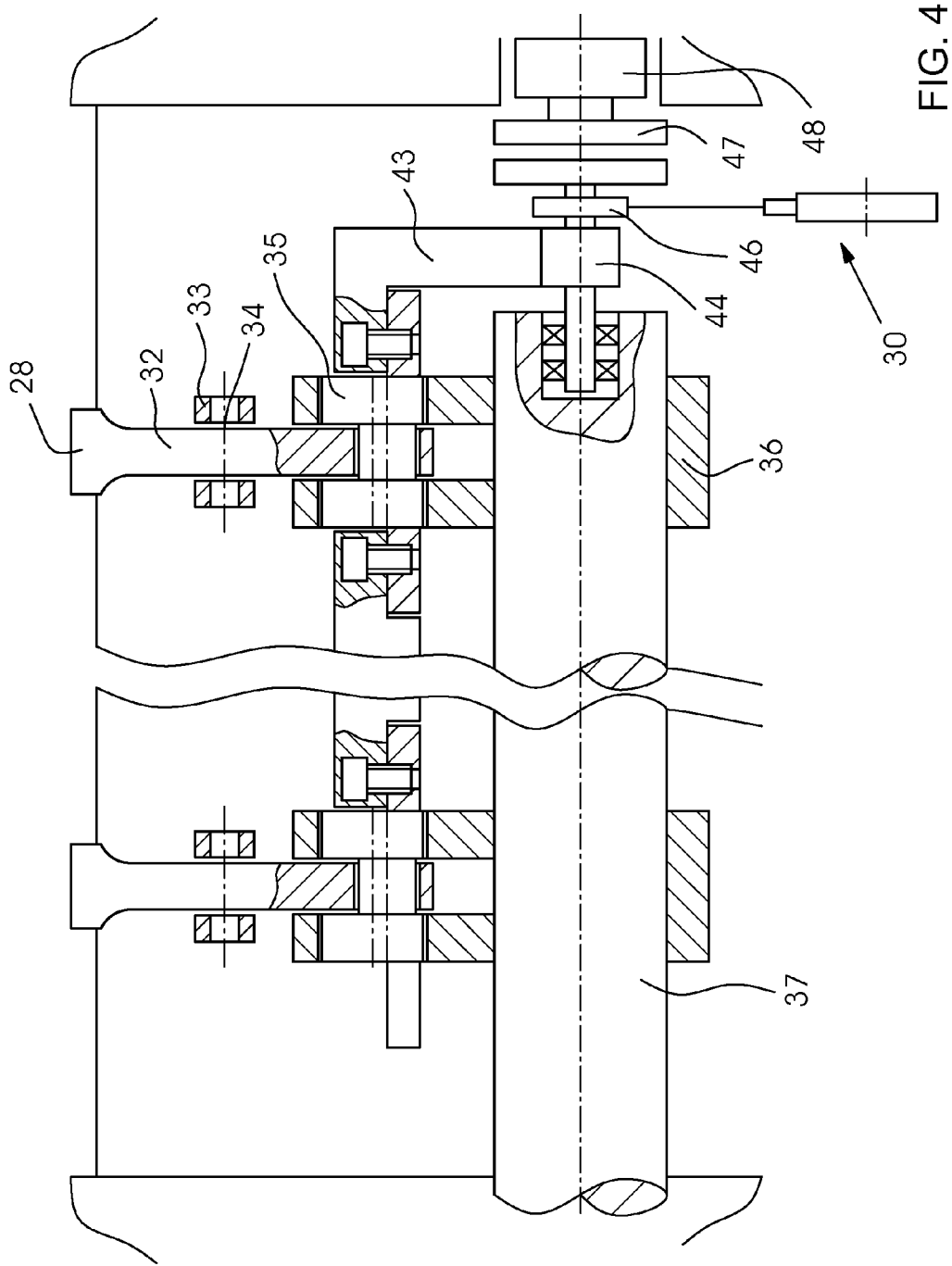
FIG. 4 is a plan view showing the drive shaft and an eccentric shaft.

In order to adjust the eccentric shaft 35 and therefore the vertical adjustment of the top/front lay 28, the eccentric shaft 35 has a toothed segment 43, which meshes with an adjustment gear 44 rotatably disposed on the drive shaft 37. In the preferred exemplary embodiment, the adjustment gear 44 is disposed on a shaft 46 which is rotatably mounted in one end of the drive shaft 37, as seen in FIG. 4.

A controllable clutch 47 connects the shaft 46 to an actuating motor 48. Non-illustrated sensors determine the position of the combined front/top lay 28 and forward the position thereof to a control computer of the sheet processing machine 1. Appropriate actuating signals are transmitted from the control computer both to the actuating motor 48 for the rotation of the adjustment gear 44 and to the actuating motor 42 for the displacement of the swivel bearing 34.

In order to carry out vertical adjustment of the front/top lay 28, e.g. to a greater gap width between the front/top lay 28 and the feed table 9, such as is necessary, for example, when processing thicker sheets or board, firstly the clutch 47 is engaged (closed). Then, the actuating motor 48 rotates the adjustment gear 44 and therefore the toothed segment 43 by a predefined amount. In this case, as a result of the eccentric mounting, the eccentric shaft 35 and the front/top lay carrier 32 disposed thereon as well as the front/top lays 28 are raised.

The clutch 47 is then disengaged and the actuating motor 42 is activated if appropriate, in order to correct the position of the front/top lays 28 in such a way that the latter are disposed on the desired line of alignment.

Figure 5:
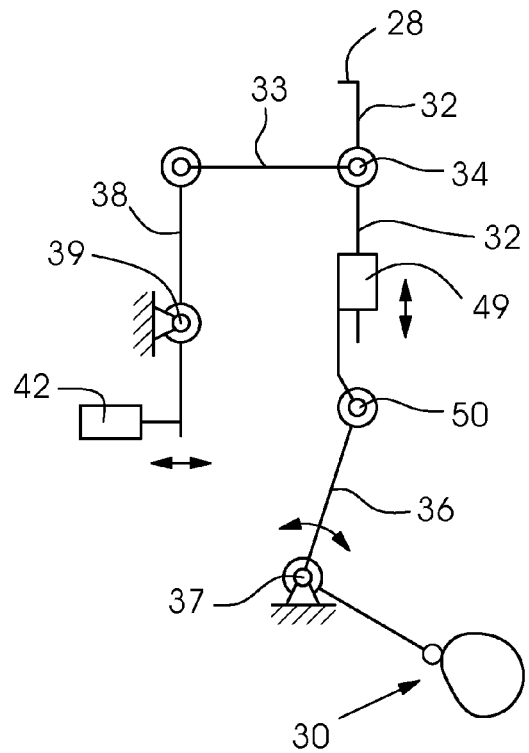
FIG. 5 is a diagram showing a third exemplary embodiment of the apparatus with a linear adjusting device for a coupling link.

In a third exemplary embodiment, according to FIG. 5, provision is made for the front/top lay carrier 32 to have a thrust joint 49 for lengthening the front/top lay carrier 32 between a bearing or carrier shaft 50 for the front/top lay 28 and the swivel bearing 34 for the front/top lay carrier 32. The thrust joint 49 or the lengthening element can, for example, be a nut/spindle mechanism. In the event of an actuation (e.g. an adjustment to a greater sheet thickness), the distance of the swivel bearing 34 for the front lay carrier 32 from the drive shaft 37 is enlarged as a result, so that the front/top lays 28 are raised.

Figure 6:
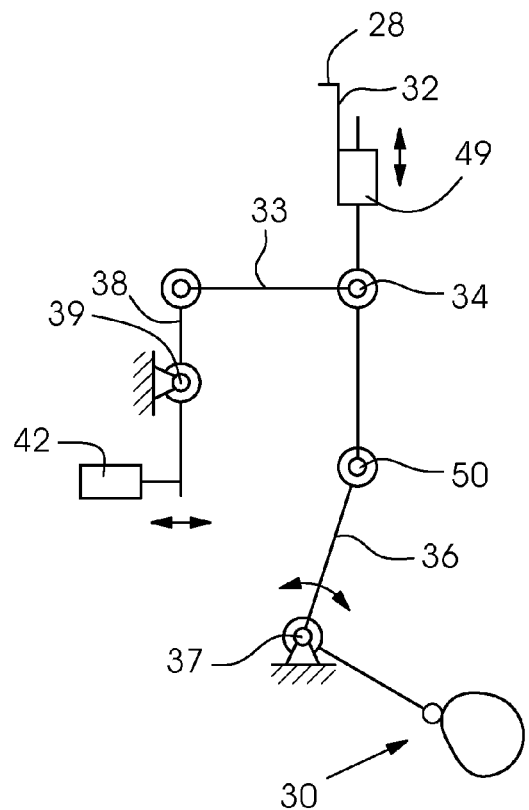
FIG. 6 is a diagram showing a fourth exemplary embodiment of the apparatus.

In a fourth exemplary embodiment, according to FIG. 6, the thrust joint 49 is disposed between the swivel bearing 34 and the front/top lays 28. As a result of this measure, the front/top lay carrier 32 extends above the bearing point 34 in the event of an adjustment, for example to thicker sheets, so that the gap between the front/top lay 28 and the feed table 9 becomes greater.

Figure 7:
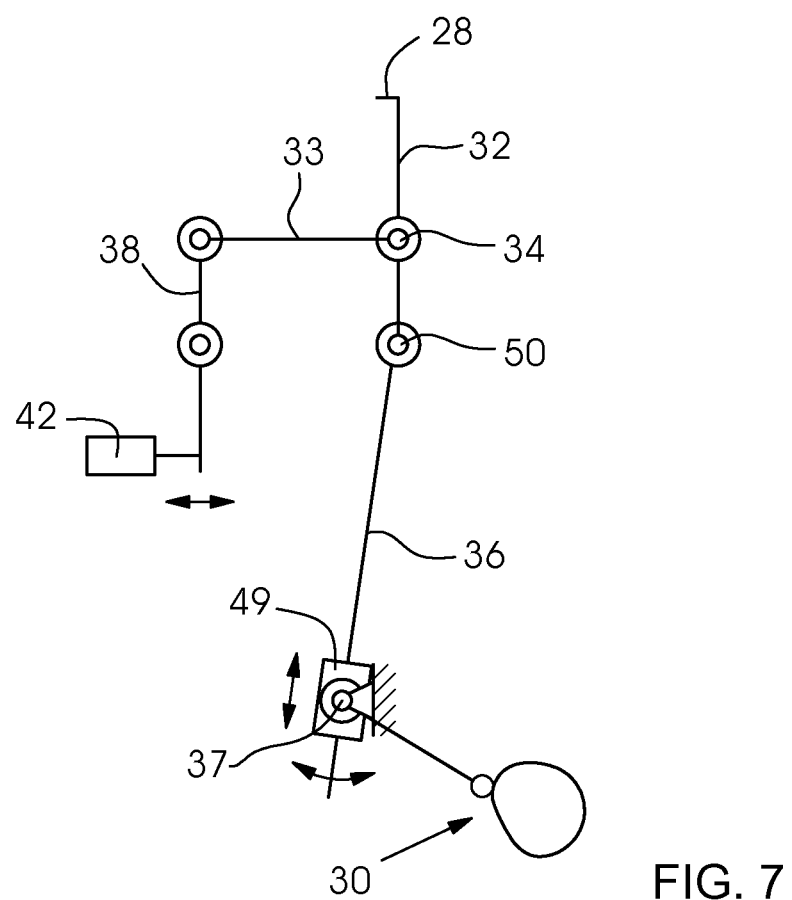
FIG. 7 is a diagram showing a fifth exemplary embodiment of the apparatus.

In a fifth exemplary embodiment, according to FIG. 7, the thrust joint 49 is disposed between the front/top lay carrier shaft 50 for the front/top lay 28 and the drive shaft 31 in the region of the lever 36.

Given a vertical configuration of the front/top lay carrier 32 and the lever 36, if thrust elements 49 are used, correction of the position of the front/top lays 28 in or counter to the sheet transport direction through the use of the actuating motor 42 can be omitted.

The invention claimed is:

1. An apparatus for the vertical adjustment of combined front/top lays in a sheet processing machine having a frame, the apparatus comprising:

a front/top lay drive shaft fixedly mounted to the frame;

a lever connected to said front/top lay drive shaft;

a front/top lay carrier shaft disposed parallel to said front/top lay drive shaft, mounted on said lever and configured to be displaced relative to said front/top lay drive shaft, said front/top lay carrier shaft being an eccentric shaft; and a gear drive for pivoting said eccentric shaft;

the front/top lays being mounted on said front/top lay carrier shaft to be pivoted jointly.

2. The apparatus according to claim 1, which further comprises a controllable clutch and an actuating motor associated with said gear drive.

3. The apparatus according to claim 1, which further comprises an actuating motor for adjusting the front/top lays in and counter to a sheet transport direction onto a predefined line of alignment.

4. A sheet-fed rotary printing press, comprising an apparatus according to claim 1.

* * * * *